March 29, 1932. Y. BRANCART 1,851,804

PROCESS AND MEANS FOR ROLLING GLASS

Filed Oct. 11, 1930

Inventor
Yvon Brancart
per
Attorney

Patented Mar. 29, 1932

1,851,804

UNITED STATES PATENT OFFICE

YVON BRANCART, OF RONQUIERES, BELGIUM

PROCESS AND MEANS FOR ROLLING GLASS

Application filed October 11, 1930, Serial No. 487,991, and in Belgium October 18, 1929.

This invention relates to the manufacture of thick glass plates and sheets, whether plain or decorated, and it more particularly refers to the process consisting of casting a mass of plastic glass on a table and spreading it to the required thickness by means of a roll either by moving such roll over the table or by moving the table under the roll. An inconvenience of this process as it is usually practiced, consists in the fact that owing to its plasticity the glass having passed under the roll tends to spread more towards the edges of the plate which are thus caused to become thinner than the centre portion thereof and must then be cut or knocked off if it is desired to obtain a plate of uniform thickness. Considerable waste results from the necessity of knocking off the edges, as on each side of a plate measuring say $4\frac{1}{2}'$ in width it sometimes is necessary to cut off a strip of 8 to 10" width or more.

It is the object of my present invention to do away with this inconvenience, and with this end in view, instead of using a cylindrical roll, I use a convex roll, i. e. a roll having a larger diameter at the center than near its ends. Any excess glass along the edges then spreads and compensates for the natural tendency of the glass to sink along the edges so that a plate having a substantially uniform thickness is obtained.

Figure 1:
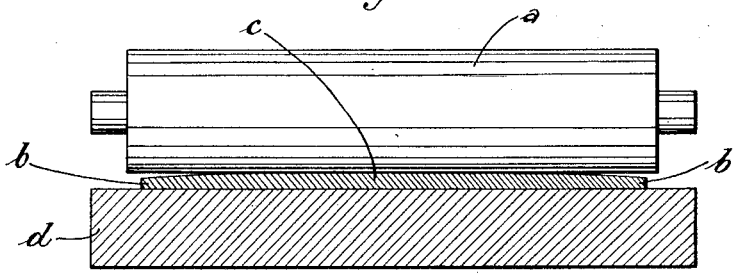
Figure 2:
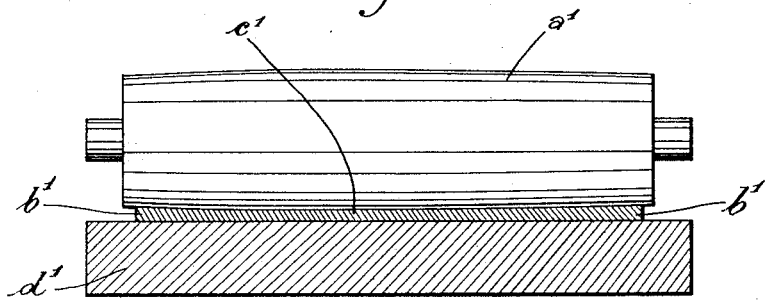
Figure 3:
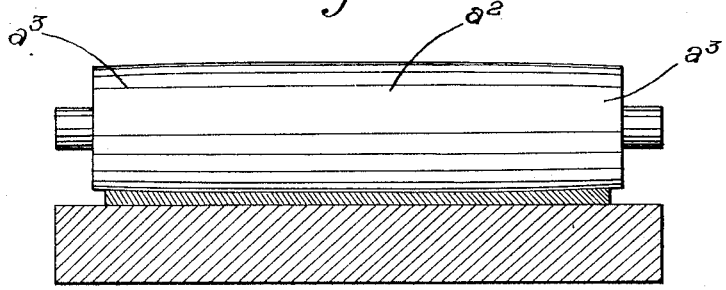

In the accompanying drawings I have shown in Fig. 1 the result obtained with an ordinary cylindrical roll and in Figs. 2 and 3 the action of convex rolls according to my invention.

As shown in Fig. 1 with a cylindrical roll $a$ the edges $b$ of the plate of plastic glass $c$ tend to spread laterally on the table $d$, and get thinner than the centre portion of the plate. On the contrary with a convex roll such as $a^1$ (Fig. 2) glass is pressed outwards from the centre of the plate towards the edges $b^1$ so as first to render the edges thicker than the center portion, so that when the glass subsequently spreads after having passed under the roll, this extra thickness compensates for the natural thinning at the edges and a plate of uniform thickness is obtained.

The convex roll $a^1$ may be smooth or ribbed or provided with impressions and it is preferably curved longitudinally as shown in Fig. 2, the radius of curvature being smaller near the ends than towards the center. The longitudinal curvature however may also be uniform throughout. In Fig. 3 the convex roll comprises a central substantially cylindrical portion $a^2$ and two conical or curved portions $a^3$.

I claim:

1. In a process of rolling glass, casting a mass of molten glass on a flat table, rolling said mass of glass with a convex roll thus forming a plate having edge portions of greater thickness than its central portion, and allowing said edges to spread freely and assume by themselves a thickness substantially equal to that of said central portion.

2. In combination with a casting table, a single roll for rolling glass on said table, said roll having a central portion of larger diameter than its end portions, said table having a laterally unconfined horizontal surface.

3. In combination with a casting table, a single roll for rolling glass on said table, said roll having a longitudinally curved outer surface, the diameter of said roll being larger at the middle than towards the ends thereof, said table having a laterally unconfined horizontal surface.

4. In combination with a casting table, a convex roll for rolling glass on said table, said roll having a longitudinally curved outer surface, the radius of said longitudinal curvature being smaller at the ends than towards the middle of said roll.

5. In combination with a casting table, a roll for rolling glass on said table, said roll having a substantially cylindrical central portion and substantially conical end portions of gradually decreasing diameter.

YVON BRANCART.